Nov. 15, 1938.  R. A. JOHNSON  2,137,164
COUNTERBALANCE FOR CRANKSHAFTS
Filed Dec. 18, 1937
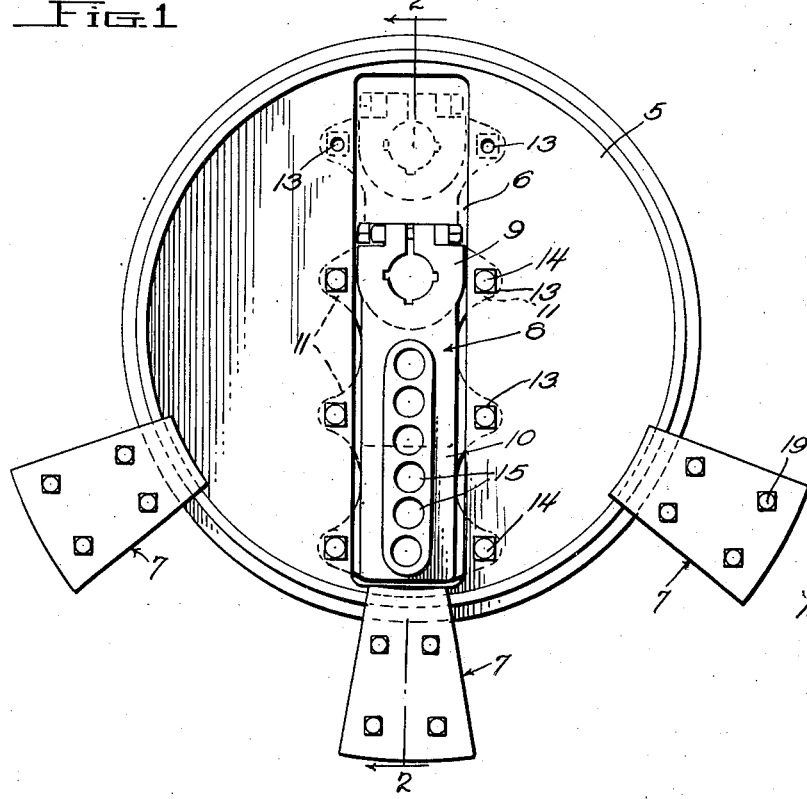
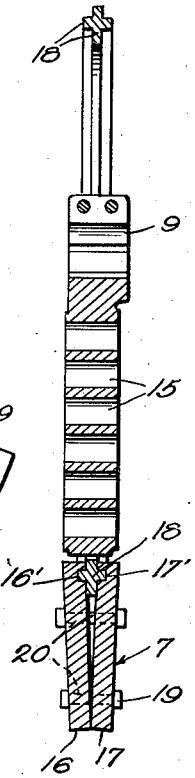
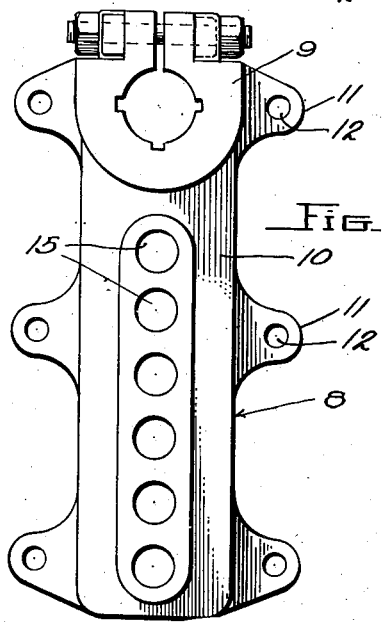
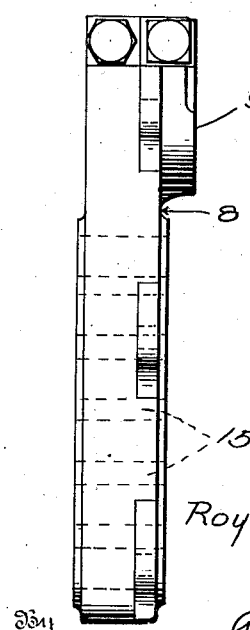
Inventor
Roy A. Johnson
Barry + Cyr
Attorneys Patented Nov. 15, 1938

2,137,164

UNITED STATES PATENT OFFICE 2,137,164

COUNTERBALANCE FOR CRANKSHAFTS

Roy A. Johnson, Tulsa, Okla., assignor to International Supply Company, Tulsa, Okla., a corporation of Delaware Application December 18, 1937, Serial No. 180,647

2 Claims. (Cl. 74—591)

This invention relates to improvements in counterbalances for crank shafts, and more particularly to counterbalances for crank shafts employed in conventional well pumping and drilling apparatus.

The primary object of the invention is to provide a crank disc and means for adjustably mounting the crank bearing and arm thereon.

A further object is to furnish improved counterweight means for the perimeter of the crank disc.

Another object is to supply counterbalance weights which may be readily adjusted circumferentially to various positions about the perimeter of the crank disc.

A still further object is to provide an adjustable crank arm associated with the crank disc and having means for adjustably connecting a pitman thereto.

A further object is to supply a particular structure and arrangement of parts whereby the adjustment of the position of the weights upon the crank disc, and the position of the disc on the crank shaft may be readily performed.

With the foregoing objects outlined and with other objects in view which will appear as the description proceeds, the invention consists in the novel features hereinafter described in detail, illustrated in the accompanying drawing, and more particularly pointed out in the appended claims.

In the drawing,

Fig. 1 is a side elevation of my improved crank disc with the counterweights and adjustable crank arm mounted thereon.

Fig. 2 is a vertical sectional view taken on the line 2—2 of Fig. 1.

Fig. 3 is a side elevation of the adjustable crank arm and bearing.

Fig. 4 is an edge view of said crank arm and bearing.

Referring to the drawing in detail, 5 designates a crank disc, preferably made of a solid metal casting, and having a diametrical substantially rectangular slot 6. As shown in Fig. 2, the periphery of the disc is substantially cross-shaped in radial section, and is adapted to be engaged by the counterweights 7 in a manner hereinafter described.

A crank arm 8 is provided at one end with a crank bearing 9 adapted to be secured to a crank shaft (not shown) normally rotated by a suitable source of power. The arm 8 is positioned mainly in the slot 6 of the crank disc and has an elongated body portion 10 provided with pairs of oppositely disposed apertured ears 11. The aperture 12 of each ear is adapted to register with a complementary aperture 13 on the crank disc. As shown in Fig. 1, each pair of apertures 12 and 13 is spaced an equal distance from an adjacent pair of apertures, and due to this construction, the crank disc may be readily adjusted diametrically to various positions relatively to the crank arm. Bolts 14 extend through the apertures 12, 13, for securing the disc in position on the crank arm. Fig. 1 shows two positions of adjustment of the disc relatively to the crank arm, one in full lines, and the other in dotted lines, but it will be understood of course, that other positions of adjustment of the disc relatively to the crank arm bearing may be obtained by changing the positions of the holes 12, 13.

The crank arm is also provided with a longitudinally arranged row of spaced apertures 15, adapted to receive the wrist pin (not shown) for connecting the pitman of a conventional pumping rig to the crank arm. These apertures permit the attachment of the pitman to the crank at various positions toward or away from the bearing 9, depending upon the length of the stroke desired in the pumping operation.

The counterweights 7 are composed of complementary parts or sections 16 and 17. These weights are substantially fan shape in plan, and are provided at their inner ends with arcuate grooves or recesses 16', 17', adapted to receive the arm portions 18 of the cross-shaped perimeter of the crank disc, as clearly shown in Fig. 2. After the sections 16, 17 of the counterweight are located at the proper position on the perimeter of the crank disc, bolts 19 are inserted through registering holes 20 in said sections for clamping the latter in engagement with the disc. Of course, if it is desired to change the position of one or more of the counterweights about the perimeter of the disc, the bolts 19 may simply be loosened without entirely disconnecting the two sections of the weight, and the latter may then be shifted along the perimeter of the disc to the desired position, and then clamped in this new position by tightening the bolts.

In practice, it will be understood that the crank shaft (secured to the bearing member 9), rotates the arm 8 which is in turn connected to the ordinary pitman of a conventional pumping rig, for reciprocating said pitman. The adjustable weights 7 secured to the periphery of the crank disc act to counterbalance varying heavy loads to which the well drilling and pumping apparatus are subjected. In order to compensate for variations in the loads to which the equipment are subjected, it has heretofore been the practice, in addition to shifting the weights about the periphery of the disc, to substitute counterweights of different sizes, and this, of course, makes it necessary to keep on hand a large supply of counterweights of different weights. With the present invention, due to the diametrical adjustment of the crank disc relatively to the crank arm, the counterweights may all be of the same size and weight, since the counterbalancing effect of the weights may be supplemented by simply moving the crank disc diametrically with respect to the crank arm. This, as before explained, may be accomplished by removing the bolts 14 and moving the disc diametrically until apertures 13 come into alignment with another pair of apertures 12 in the ears of the crank arm. In this manner, an additional adjustment of the counterbalancing effect of the weights 7 is obtained without the necessity of substituting weights of other sizes.

Furthermore, in view of the special construction of the crank disc and crank arm as herein described, it will be noted that the same size disc may be used for various pump load requirements, by simply adjusting the disc relatively to the crank arm to take care of the required load.

From the foregoing it is believed that the construction, operation and advantages of my invention may be readily understood by those skilled in the art, and it is apparent that changes may be made in the details disclosed, without departing from the spirit of the invention, as expressed in the claims.

What I claim and desire to secure by Letters Patent is:

1. In a device of the character described, a circular crank disc having a diametrical substantially rectangular slot extending across the same from one point of its peripheral portion to a diametrically opposite point thereof, a crank arm having a substantially rectangular body portion positioned in said slot and adjustable lengthwise thereof, said crank arm being provided with a series of apertures arranged lengthwise thereof, means detachably securing the arm to said disc, and weights detachably secured to the periphery of said discs and capable of adjustment to various positions about the peripheries of said discs.

2. In a device of the character described, a circular crank disc having a diametrical substantially rectangular slot extending across the same from one point of its peripheral portion to a diametrically opposite point thereof, said disc having rows of apertures arranged longitudinally at each side of said slot, a crank arm having a substantially rectangular body portion positioned in said slot and provided with a series of apertures arranged parallel to the slot, oppositely disposed ears on said crank arm having apertures adapted to be brought into alignment with the apertures in said disc, means extending through the apertures in said disc and said ears and detachably securing the disc to said arm, and weights detachably secured to the periphery of said disc and capable of adjustment to various positions about the periphery of said disc.

ROY A. JOHNSON.